United States Patent [19]

Tasset

[11] Patent Number: 4,464,528
[45] Date of Patent: Aug. 7, 1984

[54] PROCESS FOR MAKING CATIONIC STARCH
[75] Inventor: Emmett L. Tasset, Freeport, Tex.
[73] Assignee: The Dow Chemical Company, Midland, Mich.
[21] Appl. No.: 450,328
[22] Filed: Dec. 16, 1982
[51] Int. Cl.³ .................... C08B 31/08; C08B 31/12
[52] U.S. Cl. .................................................. 536/50
[58] Field of Search ........................................ 536/50
[56] References Cited

U.S. PATENT DOCUMENTS

| | | | |
|---|---|---|---|
| 2,876,217 | 3/1959 | Paschall | 536/50 |
| 3,422,087 | 1/1969 | Caesar | 536/50 |
| 4,127,563 | 11/1978 | Rankin et al. | 536/50 |
| 4,322,935 | 6/1982 | Fischer et al. | 536/50 |

FOREIGN PATENT DOCUMENTS

| | | | |
|---|---|---|---|
| 699937 | 12/1964 | Canada | 536/50 |
| 715566 | 8/1965 | Canada | 536/50 |

*Primary Examiner*—Ronald W. Griffin
*Attorney, Agent, or Firm*—A. C. Ancona

[57] ABSTRACT

A process for making a cationic starch which comprises reacting by heating starch with a quaternary amine chlorohydrin in the presence of an alkali metal oxide or hydroxide, adding thereto after a period of time an alkaline earth oxide or hydroxide and maintaining the mixture for a time and at a temperature sufficient to complete the reaction, neutralizing filtering, washing and recovering the cationic starch product.

20 Claims, No Drawings

PROCESS FOR MAKING CATIONIC STARCH

BACKGROUND OF THE INVENTION

The preparation of cationic starch is a well known commercial process. The basic water-slurry process for the quaternization of starch employing the reaction product of epichlorohydrin and an amine is taught in U.S. Pat. No. 2,876,217. The art also teaches that in such a process an alkali metal salt, e.g. NaCl or $Na_2SO_4$ should be used to inhibit gelatinization. The starch is usually slurried in water at a dry weight (d.b.) of from about 10 to about 42%. Reaction times are generally 12-20 hours, the slurry is maintained at a pH of 11-12 and the temperature must be low to prevent gelatinization during the process, generally from room temperature up to about 50° C. The reaction product must then be neutralized and washed to remove salts. According to teachings of U.S. Pat. No. 3,422,087 cationic starch products can be made in the absence of alkali and at temperatures much higher than normal, up to just under 200° C. which is the browning temperature of the polysaccharide.

While the majority of the art recommends using slurries of up to about 40% dry starch solids and a basic catalyst of an alkali or alkaline earth metal oxide or hydroxide, the present inventor has found that a high solids starch slurry of from 42-44% (d.b.) can be effectively used in the method of the prior art, but that when a particular catalyst, consisting of both alkali and alkaline earth metal oxides or hydroxides, is used, a reduction in the viscosity occurs unexpectedly, allowing the use of a higher starch solids content of up to 46% (d.b.) which results in improved conversions and yields of cationic starch.

SUMMARY OF THE INVENTION

The use of a combination of calcium oxide (lime) and sodium hydroxide (caustic) as a catalyst in a particular order in the reaction for making cationic starch reduces viscosity and permits use of higher starch solids which results in superior yield of desired product compared to the use of either lime or caustic alone. The reaction is initiated with caustic and completed with lime.

DETAILED DESCRIPTION OF THE INVENTION

The catalyst of the present invention is a combination of sodium hydroxide and calcium oxide employed in sequence, the latter being added after the reaction has been initiated by the former. The caustic catalyst is employed at from about a concentration of about 0.35 to about 1.2% by weight and preferably from about 0.6 to about 1.0%; while the lime is employed at a concentration of from about 0.15 to about 0.8% by weight, preferably from 0.3 to 0.6%. The amounts of each catalyst are based on the weight of the total reaction mixture. The use of less than the indicated amount of either catalyst will give low yields and, in the case of adding insufficient lime, gelation can occur. Too much of either is uneconomical and mixing the slurry of reactants becomes difficult with too much lime and filtering is difficult with too much caustic.

The present invention concerns the reaction of starch with a compound of the formula

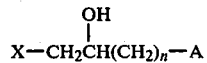

wherein A is

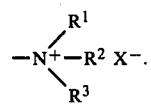

X is chlorine or bromine, $R^1$, $R^2$ and $R^3$ are independently selected from the group of $C_1$-$C_4$ straight or branched alkyl radicals with the proviso that the total number of carbon atoms in $R^1$, $R^2$, and $R^3$ does not exceed 8, and n is 1-3. Thus, for example, starch is reacted with 3-chloro-2-hydroxypropyltrimethylammonium chloride according to the method of the present invention by employing an aqueous starch slurry of 40-46% by weight of dry starch with from about 2% to about 4% by weight of 3-chloro-2-hydroxypropyltrimethylammonium chloride in the presence of about 0.5% to about 2.0% by weight of a gelatinization inhibitor salt, all based on total reaction mixture. At lower temperatures, which reduce the rate of gelatinization, the use of a gelatinization inhibitor can be omitted, but in order to shorten the time of reaction the temperature should be increased and a gelatinization inhibitor used. Even at lower temperatures it is preferred to use a gelatinization inhibitor since this, of itself, increases the rate of reaction.

Below 40% starch in the slurry the yields become unacceptably low, whereas above 46% stirring of the reactants becomes difficult and gelatinization is likely to occur. When the cationic reagent is employed at less than the lower operable limit the product becomes less effective as a paper additive. More than the indicated operable amount is uneconomical and of no additional benefit. More than the operable level of gelatinization inhibitor is likewise uneconomical and of no further benefit.

The time of reaction is from about 4 to about 14 hours, depending upon the temperature, and preferably from about 7 to 10 hours. Temperatures in the range of from about 35° to about 60° C. are employed and preferably from about 45° to about 55° C.

The yields of the process of the present invention are from about 70 to about 85%. This compares to yields in the range of 55% to 60% known and practiced in the prior art. In addition to the yield advantage, shorter reaction time and reduction in waste effluents are achieved.

Although corn starch is exemplified in the following experiments, wheat, rice, potato and (waxy) maize starches can also be employed in the present process.

While caustic and lime are illustrated, potassium oxide or hydroxide can be used in place of the caustic; barium oxide or hydroxide can be used in place of lime.

Salts other than sodium sulfate can be used as gelatinization inhibitors. Thus, for example, NaCl, KCl, $K_2SO_4$, $Na_2CO_3$ and $K_2CO_3$ can be utilized for this purpose. The sulfates are preferred.

After the reaction is complete, the resultant cationic starch is ordinarily neutralized with an acid, such as hydrochloric, citric, nitric, phosphoric, adipic, and the like to a pH of neutral or below, usually about 6. The steps of the improved process are (1) a quaternary amine salt containing a chlorohydrin group is reacted with an aqueous solution of an alkali metal hydroxide to form an epoxide from the chlorohydrin, (2) starch is added to said solution to form a slurry, (3) the mixture is heated to start the reaction, (4) an alkaline earth oxide or hydroxide is added to the reaction mixture and heating is continued for a sufficient time to complete the cationization of the starch, (5) the reaction mixture is then colled, (6) neutralized with acid and (7) filtered and (8) washed. The product obtained normally is dried before use.

The following experiments are representative of the invention and of the known art for comparison.

EXAMPLE 1

To a 500 ml round bottom flask, equipped with stirrer and placed in a 50° C. constant temperature bath, was added 15.4 g of a 50% solution of 3-chloro-2-hydroxypropyltrimethylammonium chloride plus a caustic solution made of 2 g NaOH diluted with 97 g of water. The contents was stirred and after formation of the epoxide which was determined by a drop of the pH from 13.2 to 12.3 (approximately 2 minutes), 121.74 g of corn starch mixed with 2.7 g of $Na_2SO_4$ was fed into the pot at a rate insuring uniform dispersion (10–15 minutes). This mixture was heated with stirring at 50° C. for 10 minutes, during which time the pH dropped to about 10. Then a slurry of 1 g CaO in 3 g of water was added, increasing the pH from 10.0 up to 11.4. The mixture of reactants was maintained at that temperature with stirring for 8 hours. At the end of this reaction period, 10 ml of water was poured in to further reduce the viscosity. Then the pH was lowered to 6.5 by neutralizing with 1N HCl. The starch slurry was filtered and washed four times with 100 ml quantities of water. A nitrogen content of 0.463% was obtained for this run which was a 79% yield based on the 3-chloro-2-hydroxypropyltrimethylammonium chloride reactant.

In a similar manner other experiments were conducted. The addition order (except where noted) was always (1) sodium hydroxide, (2) water, (3) chlorohydrin quaternary amine salt, (4) starch + salt inhibitor and (5) calcium oxide.

The temperature at which the reactions were conducted were: Runs 1–5 and 15 (45° C.); Runs 6–14 (50° C.). The times of reaction were all 8 hours except as noted.

The amounts of catalysts (a) NaOH and (b) CaO are given for each run as are the amounts of quaternary salt (quat), water, starch and inhibitor salt ($Na_2SO_4$).

All samples were neutralized to pH 6 at the end of the reaction, filtered and washed four times with 100 ml or 10 ml of water depending upon size of reaction. Yield was measured by the increase of nitrogen as analyzed by the Kjeldahl method.

| Run | Catalysts[4, 5] (g) | Quat[1] (g) | $H_2O$ (g) | Starch[2] (g) | $Na_2SO_4$ (g) | Dry Starch % by wt. | Reaction pH | Filtration (min.) | Viscosity[3] (cps) | Yield (%) |
|---|---|---|---|---|---|---|---|---|---|---|
| | | | | EXAMPLE 2 | | | | | | |
| 1 | (a) 0.16 (b) 0.1 | 1.19 | 10 | 12.17 | 0.27 | 44.9 | 11.9 | <30 | 65 | 77 |
| 2 | (a) 1.6 (b) 1.0 | 11.9 | 100 | 121.7 | 2.7 | 44.9 | 11.9 | <30 | 65 | 83 |
| 3 | (a) 0.16 (b) 0.1 | 1.19 | 12 | 12.17 | 0.27 | 41.4 | 11.9 | <30 | 30 | 81 |
| 4 | (a) 2.0 (b) 1.0 | 15.4 | 100 | 121.7 | 2.7 | 44.2 | 11.5 | <30 | 65 | 73 |
| 5 | (a) 2.46 (b) 1.0 | 19.25 | 97 3 | 121.7 | 2.7 | 43.4 | 11.5 | <30 | 65 | 68 73 |
| 6 | (a) 2.46 (b) 1.0 | 19.25 | 97 3 | 121.7 | 2.7 | 43.4 | 11.5 | <30 | 65 | gelled |
| 7 | (a) 2.0 (b) 1.0 | 15.4 | 97 3 | 121.7 | 2.7 | 44.2 | 11.5 | <30 | 65 | 70 79 83 |
| 8 | (a) 2.0 (b) 1.0 | 15.4 | 87 3 | 121.7 | 2.7 | 46.1 | 11.5 | <30 | >65 | 85 |
| 9 | (a) 2.0 (b) 1.0 | 15.4 | 197 3 | 121.7 | 2.7 | 31.3 | 11.5 | <30 | 20 | 62 |
| 10 | (a) 2.0 (b) 1.0 | 15.4 | 97 3 | 121.7 | 2.7 | 44.2 | 11.5 | 60 | 65 | 77 |
| 11 | (a) 2.0 (b) 1.0 | 15.4 | 97 3 | 121.7 | 1.7 | 44.3 | 11.5 | <30 | 65 | 78 |
| | | | | EXAMPLE A (Comparative) | | | | | | |
| 12 | (a) 2.0 | 15.4 | 100 | 121.7 | 2.7 | 44.4 | 10 | <30 | 300 | 35 |
| 13 | (a) 2.7 | 15.4 | 100 | 121.7 | 5.5 | 43.7 | 11 | >4 hr. | 300 | — |
| 14 | (a) 2.0 (b) 0.7 | 15.4 | 100 25 | 121.7 | 2.7 | 40.1 | 11.4 | <30 | 25 | 63 |
| | | | | EXAMPLE B (Comparative) | | | | | | |
| 15 | (a) (b) 3.5 | 15.4 | 95 5 | 121.7 | 2.7 | 44.1 | 11.6 | <30 | 130 | 72 |

[1] A 50% aqueous solution of 3-chloro-2-hydroxypropyltrimethylammonium chloride.
[2] Grams of corn starch with 11.9% water content.
[3] As measured with a Brookfield Viscometer (spindle #2).
[4] Note that the (b) CaO was mixed with 3 g of water before addition in Runs 5–11 and in Run 15 with 5 g of water.
[5] Run 1 - CaO added immediately after starch; Runs 2 and 3 - CaO added 5 minutes after starch; Runs 4–9, 11 and 15 - CaO added 10 minutes after starch; Run 10 - CaO added 30 minutes after starch; Runs 12 and 13 had no CaO added; Run 14 had NaOH added in two increments, but no CaO.

I claim:

1. In a process for making a cationic starch wherein a halohydrin quaternary amine compound is reacted with a starch in an alkaline aqueous slurry at a dry starch solids content of at least 40% by weight, the improvement which comprises the steps of:
   (a) providing an aqueous solution of an alkali metal oxide or hydroxide as catalyst in an amount of from about 0.35 to about 1.2% based on the total weight of the reaction mixture, (b) adding thereto said halohydrin quaternary amine compound, (c) reacting by heating for a sufficient time to form the epoxide from said halohydrin compound, (d) adding said starch to form a slurry in the reaction mixture, (e) adding an alkaline earth metal oxide catalyst to said reaction mixture in an amount of from about 0.15 to about 0.8% based on the total weight of the reaction mixture, (f) reacting by heating for a sufficient time to complete the cationization of the starch, (g) cooling said reaction mixture, (h) neutralizing by the addition of an acid, (i) filtering, washing and recovering said cationic starch.

2. The process of claim 1 wherein the halohydrin quaternary amine compound has the formula $$X-CH_2\overset{OH}{\underset{|}{C}}H(CH_2)_n-A$$

wherein A is

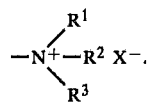

X is chlorine or bromine, $R^1$, $R^2$ and $R^3$ are independently selected from the group of $C_1$-$C_4$ straight or branched alkyl radicals with the proviso that the total number of carbon atoms in $R^1$, $R^2$, and $R^3$ does not exceed 8, and n is 1-3.

3. The process of claim 2 wherein the alkali metal is sodium or potassium and the alkaline earth metal is calcium or barium.

4. The process of claim 3 wherein the starch is present at up to about 46% (d.b.) by weight of the reaction mixture.

5. The process of claim 4 wherein a gelatinization inhibitor salt is added to the reaction mixture prior to the addition of the alkaline earth metal oxide catalyst.

6. The process of claim 5 wherein the inhibitor salt is sodium or potassium salt.

7. The process of claim 6 wherein the inhibitor salt is a sulfate.

8. The process of claim 7 wherein the inhibitor sulfate salt is present at from about 0.5% to about 2.0% based on total weight of reaction mixture.

9. The process of claim 8 wherein the starch is employed at from about 42 to about 44% (d.b.) and the halohydrin quaternary amine is employed at from about 2 to about 4% by weight of the reaction mixture.

10. The process of claim 4 wherein X is chlorine and n is 1.

11. The process of claim 10 wherein each of $R^1$, $R^2$ and $R^3$ is a methyl group.

12. The process of claim 4 wherein the starch is corn starch.

13. The process of claim 12 wherein the reaction temperature is within the range of from about 35° to about 60° C.

14. The process of claim 13 wherein the reaction temperature is within the range of from about 45° to about 55° C.

15. The process of claim 14 wherein the time of reaction is from about 7 to about 10 hours.

16. The process of claim 13 wherein the time of reaction is from about 4 to about 14 hours.

17. In the process of making a cationic starch by reacting in an aqueous medium said starch with a halohydrin quaternary amine compound by employing an alkaline catalyst the improvement which comprises (1) initiating said reaction with an alkali metal oxide or hydroxide in an amount of from about 0.35 to about 1.2% based on the total weight of the reaction mixture (2) thereafter adding an alkaline earth metal oxide or hydroxide to complete the reaction in an amount of from about 0.15 to about 0.8% based on the total weight of the reaction mixture.

18. The process of claim 17 wherein sodium hydroxide is employed to initiate the reaction and followed by the use of calcium oxide to complete the reaction.

19. The process of making a cationic starch which comprises (1) providing an aqueous solution of an alkali metal oxide or hydroxide as catalyst, (2) adding thereto a chlorohydrin quaternary amine compound and (3) reacting to form an epoxide from said chlorohydrin, (4) adding starch thereto in sufficient amount to make a slurry containing at least 40% (d.b.) of said starch based on total weight of the final reaction mixture, (5) adding an alkaline earth metal oxide or hydroxide to said starch slurry reaction mixture, (6) heating for a sufficient time to complete the cationization of said starch (7) cooling and (8) neutralizing said reaction mixture and thereafter (9) filtering, (10) washing and (11) recovering said cationic starch.

20. The process of claim 19 wherein the catalyst of step 1 is sodium hydroxide and that of step 5 is calcium oxide.

* * * * *

UNITED STATES PATENT AND TRADEMARK OFFICE
CERTIFICATE OF CORRECTION

PATENT NO. : 4,464,528

DATED : August 7, 1984

INVENTOR(S) : Emmett L. Tasset

It is certified that error appears in the above-identified patent and that said Letters Patent is hereby corrected as shown below:

Page 1, under References Cited, change the fourth reference from "4,322,935" to --4,332,935--.

Col. 2, line 52, change "time" to --times--.

Col. 3, line 9, change "colled" to --cooled--.

Cols. 3 and 4, in the table after the column heading for Yield, place a footnote --6--. At the bottom of the table, insert footnote 6 which should read:

--[6]Run 5 was also reacted for 13 hours for a yield of 73%; Run 7 was also reacted for 5 and 10 hours for yields of 70 and 83%, respectively.--

Signed and Sealed this

Fifteenth Day of October 1985

[SEAL]

Attest:

DONALD J. QUIGG

Attesting Officer

Commissioner of Patents and Trademarks—Designate